United States Patent
Xu et al.

(10) Patent No.: US 11,403,439 B2
(45) Date of Patent: Aug. 2, 2022

(54) METHOD AND APPARATUS FOR ROBUST REDUCTION OF SHAPE ERROR IN LASER POWDER DEPOSITION BASED ADDITIVE MANUFACTURING PROCESS DUE TO UNCERTAINTY

(71) Applicant: Siemens Aktiengesellschaft, Munich (DE)

(72) Inventors: Yi Xu, Ithaca, NY (US); Sanjeev Srivastava, Princeton Junction, NJ (US); Lucia Mirabella, Plainsboro, NJ (US); David Madeley, Louth (GB)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 392 days.

(21) Appl. No.: 16/492,311

(22) PCT Filed: Mar. 8, 2018

(86) PCT No.: PCT/US2018/021477
§ 371 (c)(1),
(2) Date: Sep. 9, 2019

(87) PCT Pub. No.: WO2018/165381
PCT Pub. Date: Sep. 13, 2018

(65) Prior Publication Data
US 2021/0141970 A1      May 13, 2021

Related U.S. Application Data (60) Provisional application No. 62/469,587, filed on Mar. 10, 2017.

(51) Int. Cl.
*G06F 30/20*    (2020.01)
*B33Y 10/00*    (2015.01)
(Continued)

(52) U.S. Cl.
CPC ............ *G06F 30/20* (2020.01); *B29C 64/153* (2017.08); *B29C 64/386* (2017.08); *G06F 17/18* (2013.01);
(Continued)

(58) Field of Classification Search
CPC ...... G06F 30/20; G06F 17/18; G06F 2113/10; B29C 64/153; B29C 64/386; B33Y 10/00;
(Continued)

(56) References Cited

U.S. PATENT DOCUMENTS 8,370,114 B1 * 2/2013 Saisan ...................... G01B 5/20
703/1
10,456,980 B2    10/2019  Rizzo, Jr. et al.
(Continued)

FOREIGN PATENT DOCUMENTS

| JP | 2005002472 A | 1/2005 |
| JP | 2016097679 A | 5/2016 |

OTHER PUBLICATIONS

International Search Report dated Aug. 2, 2018; International patent application PCT/US2018/021477; 18 pages.
(Continued)

*Primary Examiner* — Michael J Brown (57) ABSTRACT

A method of optimizing an additive manufacturing (AM) process includes receiving at least one design parameter of the AM process, receiving information relating to uncertainty in at least one other parameter of the AM process, performing uncertainty quantification in the optimization processor based on the at least one design parameters and uncertainty information to identify a shape error in an object being produced, updating the at least one design parameter of the AM process and utilizing the updated at least one design parameter in the AM process. A system for optimiz-
(Continued)

ing an AM process includes a design processor to produce at least one design parameter for an object to be manufactured, and an optimization processor to receive the at least one design parameter and uncertainty information to identify a shape error in the object to be manufactured and update the design parameters based on the shape error, prior or during the manufacturing process.

20 Claims, 5 Drawing Sheets

(51) Int. Cl.
    *B29C 64/386*    (2017.01)
    *B29C 64/153*    (2017.01)
    *G06F 17/18*    (2006.01)
    *G05B 19/40*    (2006.01)
    *G05B 13/02*    (2006.01)
    *B33Y 50/00*    (2015.01)
    *G06F 113/10*    (2020.01)

(52) U.S. Cl.
    CPC ............... *B33Y 10/00* (2014.12); *B33Y 50/00* (2014.12); *G06F 2113/10* (2020.01)

(58) Field of Classification Search
CPC .......... B33Y 50/00; G05B 2219/49007; G05B 2219/49017; G05B 2219/49018; G05B 2219/49023; G05B 2219/49027; G05B 2219/49029; G05B 13/024; G05B 19/4099; G05B 13/021; G05B 13/0205; Y02P 90/02
USPC .......................................................... 700/98
See application file for complete search history.

(56) References Cited

U.S. PATENT DOCUMENTS

| | | |
|---|---|---|
| 2009/0326706 A1 | 12/2009 | Fink et al. |
| 2010/0174392 A1 | 8/2010 | Fink et al. |
| 2015/0331402 A1 | 11/2015 | Lin et al. |
| 2016/0046076 A1 | 2/2016 | Tirthankar et al. |
| 2016/0144575 A1 | 5/2016 | Rizzo, Jr. et al. |
| 2016/0263833 A1 | 9/2016 | Vittitow et al. |
| 2017/0060810 A1* | 3/2017 | Preston .................. G06F 30/15 |

OTHER PUBLICATIONS

Hu Zhen et al.: "Uncertainty quantification in prediction of material properties during additive manufacturing", Scripta Materialia, vol. 135, Nov. 12, 2016 (Nov. 12, 2016), pp. 135-140/Nov. 12, 2016.
Japanese Decision to Grant dated Sep. 2, 20217; Application No. 2019-548998; 4 pages.
Japanese Office Action dated Mar. 22, 2021; Application No. 2019-548998; 9 pages.
Examination Report; Korean Patent Application No. 2019-7029486; 10 Pages.

* cited by examiner

METHOD AND APPARATUS FOR ROBUST REDUCTION OF SHAPE ERROR IN LASER POWDER DEPOSITION BASED ADDITIVE MANUFACTURING PROCESS DUE TO UNCERTAINTY

CROSS REFERENCE TO RELATED APPLICATIONS

This application is a national phase filing under 35 U.S.C. § 371 of International Patent Application No. PCT/US2018/021477, filed Mar. 8, 2018, which claims the benefit of priority to U.S. Provisional Patent Application Ser. No. 62/469,587, filed Mar. 10, 2017, which are incorporated herein by reference in their entirety.

TECHNICAL FIELD

This application relates to additive manufacturing processes.

BACKGROUND

Additive manufacturing (AM) involves processes where materials are joined or solidified under computer control to create a 3-dimensional (3D) object. An object to be produced may be of any shape and may be designed using computer-aided processes or applications such as computer aided design (CAD) or computer-aided engineering (CAE) tools. Other computer-based files such as additive manufacturing files (AMF) define a 3D object in terms of sequential layers of material that combine to define the overall 3D object shape. When provided to a 3D printer or additive manufacturing device, the AMF provides information to allow the 3D printing device to successively add material layer by layer to construct the desired 3D object.

One method of AM uses lasers to produce the successive layers. In laser powder deposition (LPD), or directed laser deposition, a small portion of a metal substrate is melted by the laser at a location that the additional material is to be added. Using a nozzle, a powder comprising the new material is directed using an inert gas under pressure toward the melting pool created in the substrate. The powder and melting pool are then allowed to solidify to create a new substrate. The process is repeated for each successive layer to produce the desired 3D object.

Using computer aided tools, an optimized design for the 3D object may be created. Under ideal conditions, the 3D printing device would execute the optimized design to create an optimized final product. In reality, normal variations occur which prevent the product from exactly matching the optimized design. In manufacturing applications, this leads to part quality issues, both from discrepancies between produced parts and their associated design, but also from variations arising between individual parts due to environmental factors affecting the 3D printing device. Various parameters, such as laser power, distances between the laser and substrate (stand-off distance), the distance between the nozzle and the melting pool, the movement speed of the laser, powder feed rate, as well as environmental conditions such as ambient temperature, humidity and vibration may all contribute to variations in the AM process. What is more, each of these and other sources of variation are affected by factors involving uncertainty. Being uncertain, these effects cannot be designed out and optimized during the design and engineering stage of manufacture. Moreover, other optimization techniques, such as adjusting the 3D printing device, cannot be foreseen due to the uncertainty included in the variations.

Variations have been addressed in the past through deterministic optimization during offline states, or open or closed loop controls during the printing process concentrating on observable or derived process signatures (e.g. signatures that may be seen or measured). However, these approaches cannot address uncertainty which is characterized by variation over time. Improved methods and systems to address uncertainty in AM processes is therefore desired.

SUMMARY

According to aspects of embodiments described herein, a method of optimizing an additive manufacturing (AM) process includes, in an optimization processor, receiving at least one design parameter of the AM process, receiving information relating to uncertainty in at least one other parameter of the AM process, performing uncertainty quantification in the optimization processor based on the at least one design parameters and the information relating to uncertainty to identify a shape error in an object being produced in the AM process, updating the at least one design parameter of the AM process and utilizing the updated at least one design parameter in the AM process.

The information relating to uncertainty in the at least one other parameter of the AM process may be received as a probabilistic data. The probabilistic data may be in the form of a probability distribution. According to some embodiments the probability distribution assumes a normal distribution based on Gaussian noise. In other embodiments, the probability distribution is derived from a probability distribution function based on observed knowledge.

Identifying the shape error in the object being produced may include further steps of iteratively running a simulation of the AM process based on the received at least one design parameter and the information relating to uncertainty to produce a computed shape error, quantifying the shape error at each iteration and stopping the iterations when a reliable shape error is achieved. Additive manufacturing processes according to embodiments described in this disclosure may include performing the AM process in a three-dimensional (3D) printing device. The 3D printing device is configured to perform laser powder deposition. According to aspects of embodiments of the present invention, uncertainty quantification is performed and the at least one design parameter is updated prior to commencing the AM process.

A system for optimizing an additive manufacturing (AM) process includes a design processor configured to produce at least one design parameter for an object to be manufactured by the AM process, an optimization processor configured to receive the at least one design parameter, receive information representative of an uncertainty in at least one process parameter of the AM process identify a shape error in the object to be manufactured and update the at least one design parameter based on the identified shape error. The system may further include a three-dimensional (3D) printing device configured to receive the at least one design parameter and to produce the object to be manufactured based on the at least one parameter.

According to embodiments, the 3D printing device may further include a measuring device configured to acquire measures during manufacture and provide the measures to the optimization processor, wherein the optimization processor uses the received measure information to re-compute the at least one parameter to minimize the shape error and communicates the recomputed at least one parameter to the 3D printing device.

According to some embodiments, the 3D printing device is configured to perform laser powder deposition (LPD). The information representative of an uncertainty in at least one process parameter may be in the form of a probability distribution of a manufacturing error due to the uncertainty. The at least one design parameter comprises at least one of laser power in an AM device and laser motion speed in the AM device, and the uncertainty information of the at least one process parameter may be a stand-off distance determined by a distance between a laser of an AM device and the object to be manufactured. The optimization processor may further be configured to run a simulation of the AM process, using the received at least one design parameter and the uncertainty information to iteratively calculate the shape error during the simulation of the AM process. The optimization processor may further quantify the uncertainty based on the uncertainty information during each iteration. The optimization processor may select a number of samples from the uncertainty information for determining a shape error, performing a set of simulations, each simulation based on a different number of samples, determining an average expected error and a range of error for each simulation, and selecting a number of samples corresponding to a simulation having a lowest number of samples where the range of error is smaller than a predetermined threshold value.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

The widespread adoption of AM is challenged by part quality issues including dimensional and form errors, undesired porosity, delamination of layers and poor or undefined material properties. Laser powder deposition (LPD), also known as Directed Laser Deposition, is an AM process that has received increasing attention in academic research and industrial applications. Generally, LPD acts by first melting a small portion of the metal substrate by the laser at a location where new material is being added to the work object. Next, powder of a material is ejected from a nozzle into the melting pool. The powder is directed using a stream of inert gas directed through the nozzle. The deposited powder and melting pool solidify to form a new substrate.

In the LPD process the final output object's shape and properties may be influenced by many factors such as laser power, the speed at which the laser moves, powder feed rate, distance between the nozzle and the substrate, or the distance between the laser and the substrate (e.g., stand-off distance) among other factors. For example, laser power may determine the temperature and size of the melting pool. Similarly, the material feeding rate and the laser motion speed may determine the amount of new material that is added to the workpiece in the current AM process step.

Moreover, other parameters such as stand-off distance and step over distance (the distance between each line of deposition) also affect the overall shape and quality of the printed part. Many parameters may be set at the 3D printer at the start of the printing process and are assumed to be constant throughout the printing process. In reality, these parameters vary continuously due to variations in the shape of the progressive substrates during the AM process. Environmental factors include noise, such as temperature and moisture variations, material property variations, or equipment tolerances, as well as vibration may cause significant differences between what is designed and what is actually produced. This creates a need for optimization in design and process parameters to account for variations and noise, as these create uncertainty, given the desired shape and quality of the produced part. Optimization may be performed throughout the AM process in view of the uncertainty introduced during the AM printing process.

In view of the foregoing challenges, and to ensure desirable part shape a quality to promote widespread adoption of AM technologies such as LPD it is important to address the following:

establish correlations between the AM process parameters and the process/part characteristics;

determine optimal values of uncertain process parameters before the start of the printing process; and adjust process parameters, while printing is proceeding, based on feedback from sensor measurements.

Methods and systems described in this disclosure seek to address the second and third point to determine optimal values that address uncertainty in process parameters prior to the commencement of an AM printing process. Prior approaches to this problem may include deterministic optimization processes during offline stages. During the printing process, open or closed loop control is performed through observation of visible process signatures such as melting pool shape and temperature, or derived process signatures determined through analytical modeling or simulation, such as melting pool depth and residual stress.

In embodiments of the present disclosure, a method is described to minimize the shape differences between a desired or designed object shape and an actual printed shape. In real world situations, most if not all process parameters have some degree of uncertainty. Sources of noise may include environmental uncertainties like temperature and moisture variations while running the printing equipment, and equipment uncertainties such as limited equipment accuracies (e.g., tolerances) and substrate vibration. These uncertainties cause discrepancies between the output produced and the design even if the process model used to computer optimal processing parameters is assumed to be exact. According to embodiments of this disclosure, the above challenges are addressed via an offline optimization under uncertainties (OUU).

According to embodiments, an output of OUU is distinguishable from a deterministic optimization. A deterministic optimization uses a deterministic set of values corresponding to all design parameters. In OUU, at least some parameters, instead of being held constant as in a deterministic optimization, recognize uncertainties in the form of probability distributions. According to some embodiments, a common assumption is that a given parameter is subject to Gaussian noise (e.g. normal distribution). In other embodiments, a more complex probability density function (PDF) may be considered where sufficient knowledge is available regarding the noise (e.g., from past experiments). Uncertainties relating to the parameters may be propagated to an optimization objective function by way of an uncertainty quantification (UQ) approach. Thus, the objective of OUU will be minimizing an expected value of the objective function.

An example will now be described where laser power and laser speed are assumed as design parameters, while the stand-off distance is characterized by some type of probability distribution. In this case, the goal of OUU is to optimize laser speed and laser power such that the expected shape area difference (shape error denoted $\Delta A$) due to uncertainties in stand-off distance is minimized. While this scenario is provided by way of non-limiting example, those of skill in the art will recognize that the method may be used with respect to one or more process design parameters or combinations thereof. The method may be used with different designed process parameters, uncertain parameters and objective functions.

Figure 1:
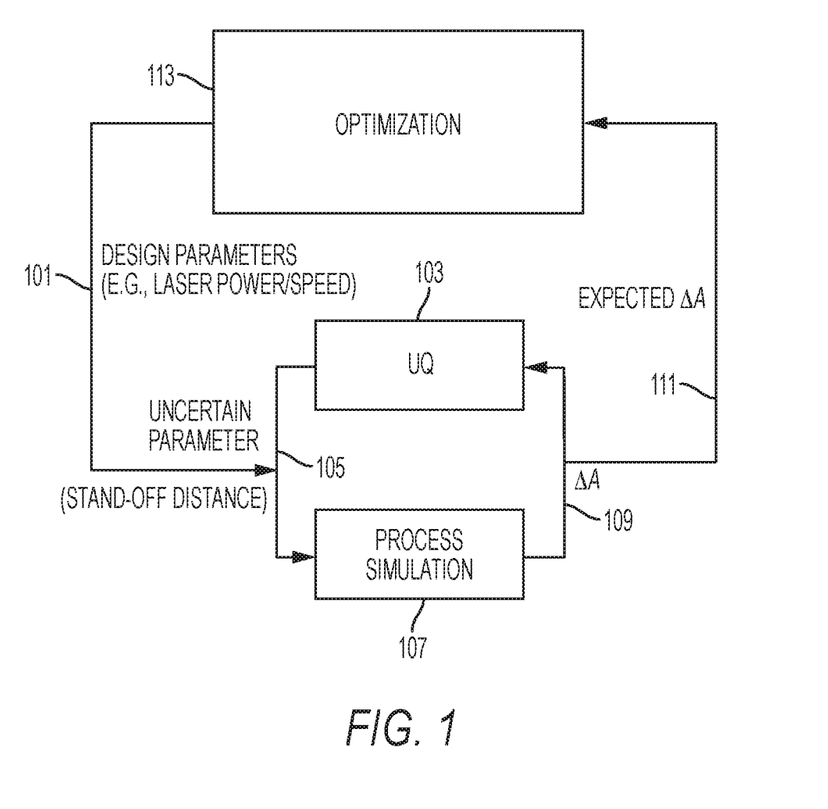
FIG. 1 is a block diagram of a process for optimizing an AM process according to aspects of embodiments of the present disclosure.

FIG. 1 is a process flow diagram illustrating an optimization workflow for laser power and laser speed with respect to uncertainties in stand-off distance according to embodiments of the present disclosure. One or more design parameters 101 are selected. With respect to the selected design parameters 101, an uncertainty quantification process 103 is performed in view of uncertainty in a parameter, such as laser position or stand-off distance 105. The AM process is simulated 107 using the selected design parameters 101 and the uncertainty in parameter 105. It is assumed that uncertainty in parameter 105 follows a probability distribution function. The simulation 107 is performed to calculate a value of shape error $\Delta A$ 109. The uncertainty is re-quantified 103 based on the shape error 109 and the uncertain parameter 105 is simulated over the PDF of uncertain parameter 105. the UQ 105 loop continues until a reliable value of $\Delta A$ 109 is found. An expected shape error 111 is provided to optimization function 113. The optimization function 113 chooses a next set of design parameters 101 taking shape error $\Delta A$ as input. The process is repeated 115 until an optimized output for design parameters 101 is generated based on uncertain parameter 105. The optimized output may be determined based on a number of iterations performed, or until the optimized design parameters 101 converge. Convergence may be determined when the change in design parameters 101 between a current iteration and a previous iteration is less than some predetermined threshold value. The goal of the optimization 113 is to minimize shape error $\Delta A$109.

To obtain the expected value of area of shape difference, the uncertain parameter 105 is sampled based on its probability distribution. An exemplary method for sampling is through uniform sampling. By way of example, the uncertain quantity may be uniformly sampled across a range from −2 times to +2 times the standard deviation of the uncertainty domain where the uncertainty (noise) is Gaussian. In this case, the expected function value of the area of shape difference is $\Sigma_{i=1}^{N} p_i f_i$ where $p_i$ is the probability of each sampling point and $f_i$ is the function value for that point, and N is the number of sampling points.

Figure 2:
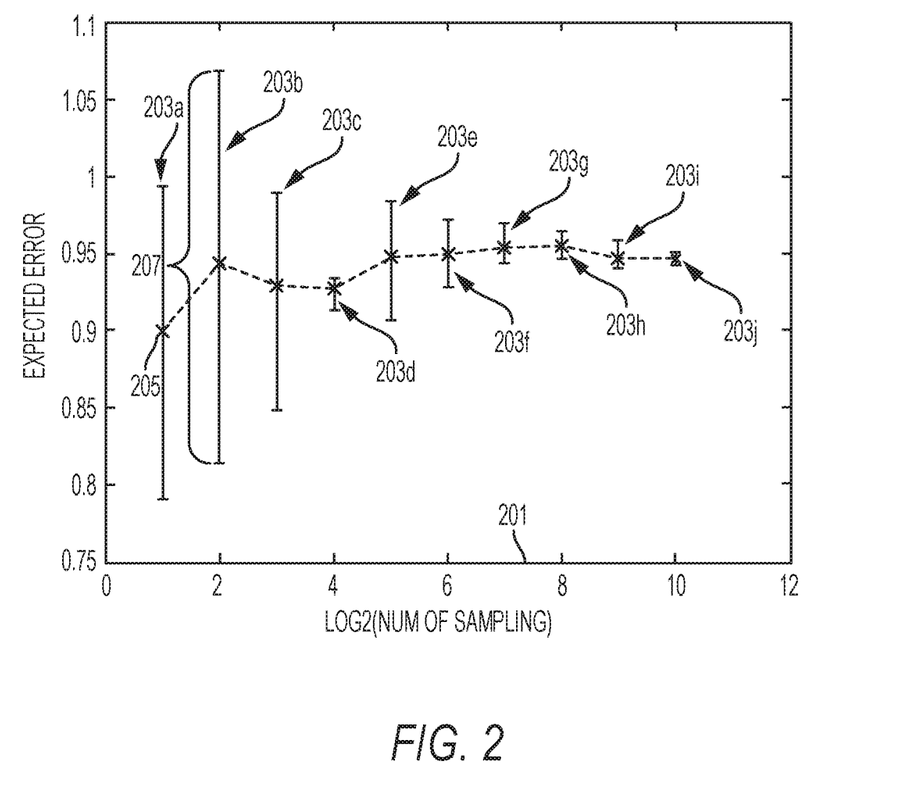
FIG. 2 is a graphical depiction for determining a number of samples to reliably determine a shape error according to aspects of embodiments of the present invention.

FIG. 2 is an illustration of an analysis for determining a number of sampling points needed according to aspects of some embodiments of the present disclosure. The number of sampling points as shown on horizontal axis 201 varies logarithmically. For different number of sampling points 10, sets of simulations $203_{a-j}$ may be performed to determine the function and determine the expected error for each set. The average 205 of the expected error and the range 207 of error is computed. If the length of the error bar is shorter than a given threshold, it may be determined that the corresponding number of samples 201 is sufficient. For example, according to one embodiment, $2^8$ samples corresponding to simulation 203h will provide a reasonable number of samples for performing uncertainty quantification.

Methods according to embodiments of this disclosure provide a stochastic optimization of additive manufacturing process parameters to reduce shape or form errors based on probability distributions for process parameters subject to uncertainty due to environmental factors or equipment variations.

Figure 3:
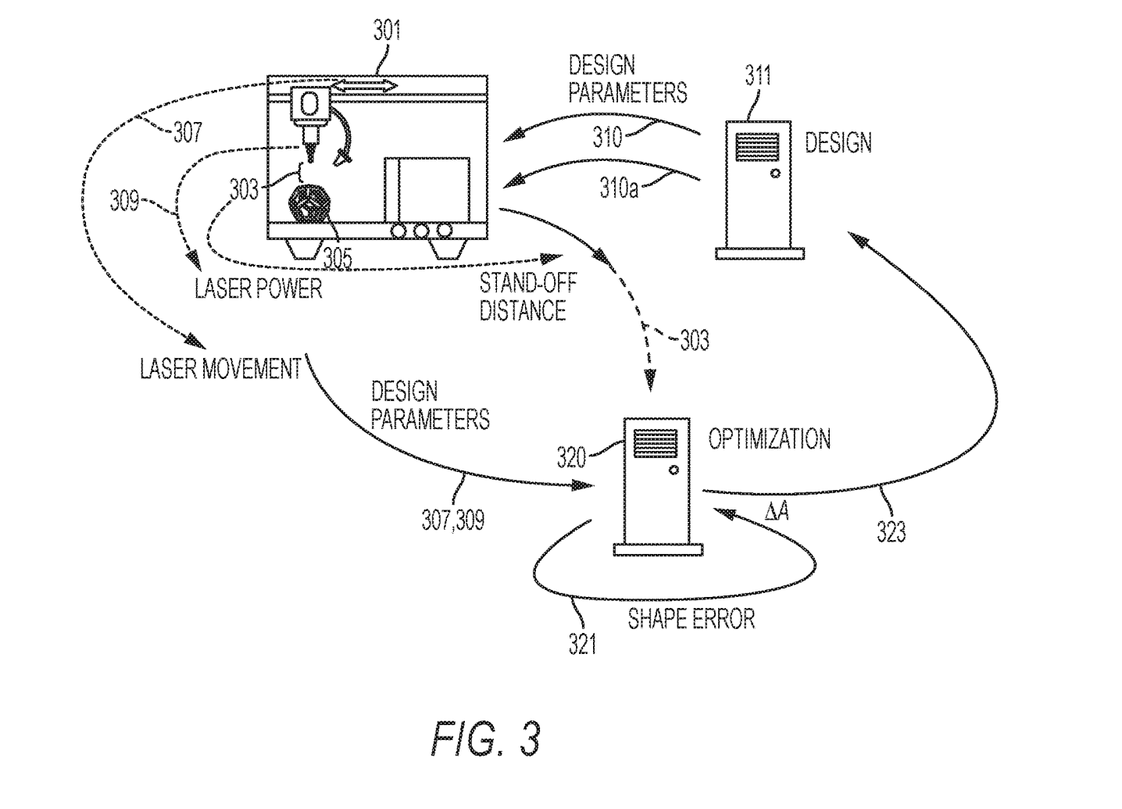
FIG. 3 is an illustration of a system for optimizing an AM process according to aspects of embodiments of the present invention.

FIG. 3 is an illustration of a system 300 for reducing shape error in AM processes according to aspects of embodiments of this disclosure. The system includes a 3D printing device 301. The 3D printing device 301 may be configured to perform LPD additive manufacturing. A design processor 311 allows a designer to provide design parameters 310 to the 3D printing device 301 which provide processing parameters allowing the 3D printing device 301 to produce a desired object 305. For example, design parameters 310 may specify properties of the 3D printing device 301 such as laser movement speed 307 and laser power 309. At the design processor 311, all processing parameters are assumed to be constant. However, some parameters may be affected by environmental factors and/or equipment limitations that create uncertainty due to uncontrolled variations in some of the processing parameters. For example, the distance between the laser and the produced object 305, known as stand-off distance 303 may vary based on environmental forces which move either the laser or the object 305. Minor perturbations, such as normal operating vibration, may cause slight movement of the object 305 causing the stand-off distance 303 to vary throughout the manufacturing process. Uncertainties in processing parameters may cause the desired shape of the designed object 305 to vary from what is actually produced because the expected processing parameters do not remain constant throughout the manufacturing process.

An optimization processor 320 is configured to identify the shape error 321. The optimization processor 320 receives the design parameters including laser power and movement 307, 309. In addition, optimization processor 320 receives information regarding the uncertainty of some parameters, for example stand-off distance 303. The uncertainty information may be received as a probability distribution, by way of example. The optimization processor performs an uncertainty quantification of a shape error determined by simulation using the received design parameters 307, 309 and the uncertain parameter 303. Simulation and uncertainty quantification is repeated until a reliable shape error is determined 321. Based on the reliable shape error an optimized set of design parameters 323 are provided to design processor 311. Design processor generates a set of updated design parameters 310*a* and provides the updated design parameters 310*a* to 3D printing device 301.

Figure 4:
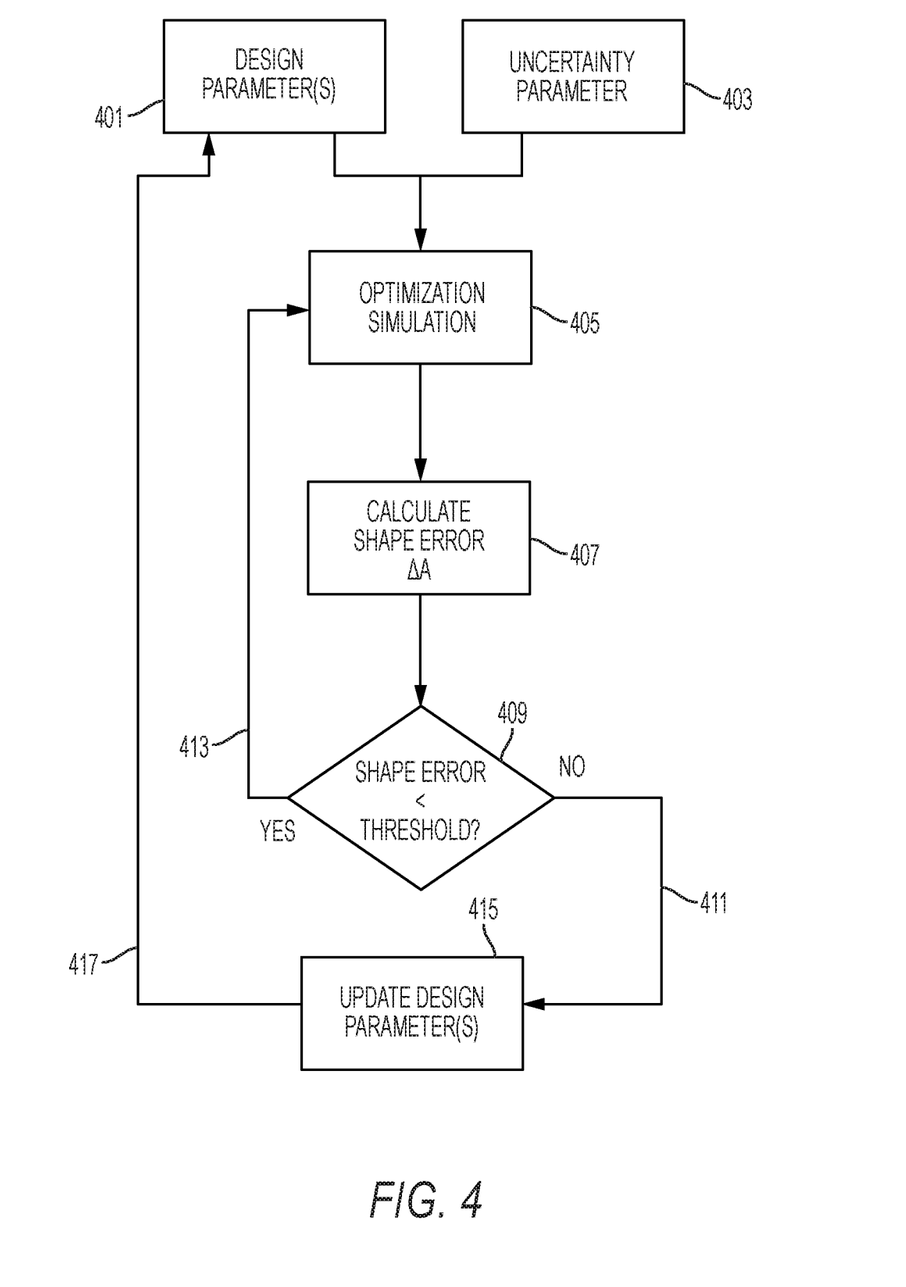
FIG. 4 is a process flow diagram for a method of optimizing an AM process according to aspects of embodiments of the present disclosure.

FIG. 4 is a process flow diagram for the optimization of design parameters in an AM process according to aspects of embodiments of the present disclosure. A plurality of design parameters 401 and at least one process parameter representative of an uncertainty in the manufacturing process 403 are received by a processor configured to perform an optimization simulation 405. The design parameters 401 may be generated by a designer using a computer aided design tool, by way of example. According to embodiments, the uncertainty parameter 403 may be in the form of a probability distribution of a shape error occurring due to uncontrolled variations in an associated process parameter. The optimization simulation 405 is performed by using the received design parameters 401 and the uncertainty parameter 403 to perform a simulation of the manufacturing process and uncertainty quantification until a reliable shape error is determined. An expected shape error is calculated 407 based on the optimization simulation 405. The expected shape error is compared to a threshold value 409 to characterize the size of the uncertainty error reflected in the shape error of the produced object. If the shape error is less than the threshold 413, the manufacturing process continues and the optimization process 405 to calculate a new expected shape error.

If the expected shape error exceeds the threshold 411, the design parameters are updated based on an optimization that minimizes the expected shape error. The updated design parameters 415 replace 417 the original design parameters 401 and an updated optimization simulation is performed based on the updated optimized design parameters.

Figure 5:
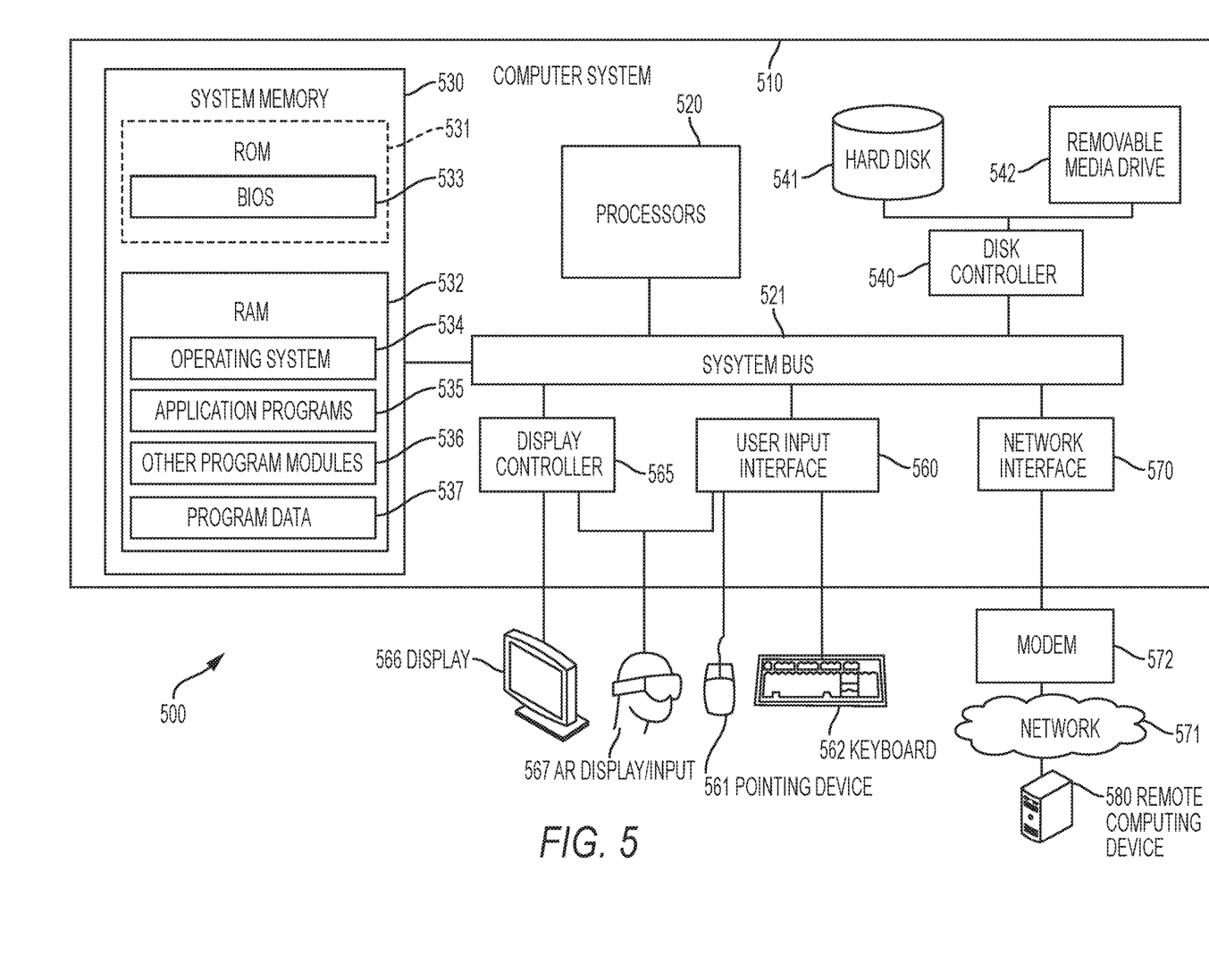
FIG. 5 is an illustration of a computer system for performing a method of optimizing an AM process according to aspects of embodiments of the present disclosure.

FIG. 5 illustrates an exemplary computing environment 500 within which embodiments of the invention may be implemented. Computers and computing environments, such as computer system 510 and computing environment 500, are known to those of skill in the art and thus are described briefly here.

As shown in FIG. 5, the computer system 510 may include a communication mechanism such as a system bus 521 or other communication mechanism for communicating information within the computer system 510. The computer system 510 further includes one or more processors 520 coupled with the system bus 521 for processing the information.

The processors 520 may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general-purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Continuing with reference to FIG. 5, the computer system 510 also includes a system memory 530 coupled to the system bus 521 for storing information and instructions to be executed by processors 520. The system memory 530 may include computer readable storage media in the form of volatile and/or nonvolatile memory, such as read only memory (ROM) 531 and/or random-access memory (RAM) 532. The RAM 532 may include other dynamic storage device(s) (e.g., dynamic RAM, static RAM, and synchronous DRAM). The ROM 531 may include other static storage device(s) (e.g., programmable ROM, erasable PROM, and electrically erasable PROM). In addition, the system memory 530 may be used for storing temporary variables or other intermediate information during the execution of instructions by the processors 520. A basic input/output system 533 (BIOS) containing the basic routines that help to transfer information between elements within computer system 510, such as during start-up, may be stored in the ROM 531. RAM 532 may contain data and/or program modules that are immediately accessible to and/or presently being operated on by the processors 520. System memory 530 may additionally include, for example, operating system 534, application programs 535, other program modules 536 and program data 537.

The computer system 510 also includes a disk controller 540 coupled to the system bus 521 to control one or more storage devices for storing information and instructions, such as a magnetic hard disk 541 and a removable media drive 542 (e.g., floppy disk drive, compact disc drive, tape drive, and/or solid-state drive). Storage devices may be added to the computer system 510 using an appropriate device interface (e.g., a small computer system interface (SCSI), integrated device electronics (IDE), Universal Serial Bus (USB), or FireWire).

The computer system 510 may also include a display controller 565 coupled to the system bus 521 to control a display or monitor 566, such as a cathode ray tube (CRT) or liquid crystal display (LCD), for displaying information to a computer user. The computer system includes an input interface 560 and one or more input devices, such as a keyboard 562 and a pointing device 561, for interacting with a computer user and providing information to the processors 520. The pointing device 561, for example, may be a mouse, a light pen, a trackball, or a pointing stick for communicating direction information and command selections to the processors 520 and for controlling cursor movement on the display 566. The display 566 may provide a touch screen interface which allows input to supplement or replace the communication of direction information and command selections by the pointing device 561. In some embodiments, an augmented reality device 567 that is wearable by a user, may provide input/output functionality allowing a user to interact with both a physical and virtual world. The augmented reality device 567 is in communication with the display controller 565 and the user input interface 560 allowing a user to interact with virtual items generated in the augmented reality device 567 by the display controller 565. The user may also provide gestures that are detected by the augmented reality device 567 and transmitted to the user input interface 560 as input signals.

The computer system 510 may perform a portion or all of the processing steps of embodiments of the invention in response to the processors 520 executing one or more sequences of one or more instructions contained in a memory, such as the system memory 530. Such instructions may be read into the system memory 530 from another computer readable medium, such as a magnetic hard disk 541 or a removable media drive 542. The magnetic hard disk 541 may contain one or more datastores and data files used by embodiments of the present invention. Datastore contents and data files may be encrypted to improve security. The processors 520 may also be employed in a multi-processing arrangement to execute the one or more sequences of instructions contained in system memory 530. In alternative embodiments, hard-wired circuitry may be used in place of or in combination with software instructions. Thus, embodiments are not limited to any specific combination of hardware circuitry and software.

As stated above, the computer system 510 may include at least one computer readable medium or memory for holding instructions programmed according to embodiments of the invention and for containing data structures, tables, records, or other data described herein. The term "computer readable medium" as used herein refers to any medium that participates in providing instructions to the processors 520 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 541 or removable media drive 542. Non-limiting examples of volatile media include dynamic memory, such as system memory 530. Non-limiting examples of transmission media include coaxial cables, copper wire, and fiber optics, including the wires that make up the system bus 521. Transmission media may also take the form of acoustic or light waves, such as those generated during radio wave and infrared data communications.

The computing environment 500 may further include the computer system 510 operating in a networked environment using logical connections to one or more remote computers, such as remote computing device 580. Remote computing device 580 may be a personal computer (laptop or desktop), a mobile device, a server, a router, a network PC, a peer device or other common network node, and typically includes many or all of the elements described above relative to computer system 510. When used in a networking environment, computer system 510 may include modem 572 for establishing communications over a network 571, such as the Internet. Modem 572 may be connected to system bus 521 via user network interface 570, or via another appropriate mechanism.

Network 571 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 510 and other computers (e.g., remote computing device 580). The network 571 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 571.

An executable application, as used herein, comprises code or machine-readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

What is claimed is:

1. A computer implemented method of optimizing an additive manufacturing (AM) process comprising:
   in an optimization processor, receiving at least one design parameter of the AM process;
   in the optimization processor, receiving information relating to uncertainty in at least one other parameter of the AM process;
   performing uncertainty quantification in the optimization processor based on the at least one design parameters and the information relating to uncertainty to identify a reliable shape error in an object being produced in the AM process;
   updating the at least one design parameter of the AM process to address the identified reliable shape error; and utilizing the updated at least one design parameter in a computer-implemented simulation of the AM process.

2. The method of claim 1, further comprising:
receiving the information relating to uncertainty in the at least one other parameter of the AM process as a probabilistic data.

3. The method of claim 2, wherein the probabilistic data comprises a probability distribution.

4. The method of claim 3, wherein the probability distribution assumes a normal distribution based on Gaussian noise.

5. The method of claim 3, wherein the probability distribution is derived from a probability distribution function based on observed knowledge.

6. The method of claim 1, wherein identifying the shape error in the object being produced comprises:
iteratively running a computer-implemented simulation of the AM process based on the received at least one design parameter and the information relating to uncertainty to produce a computed shape error;
quantifying the shape error at each iteration; and
stopping the iterations when the reliable shape error is achieved.

7. The method of claim 1, further comprising:
performing the AM process in a three-dimensional (3D) printing device.

8. The method of claim 7, wherein the 3D printing device is configured to perform laser powder deposition.

9. The method of claim 1, wherein the performing of uncertainty quantification and updating the at least one design parameter occurs prior to commencing the AM process.

10. A system for optimizing an additive manufacturing (AM) process comprising:
a design processor configured to produce at least one design parameter for an object to be manufactured by the AM process; and
an optimization processor configured to:
receive the at least one design parameter;
receive information representative of an uncertainty in at least one process parameter of the AM process;
identify a reliable shape error via uncertainty quantification in the object to be manufactured; and
update the at least one design parameter based on the identified reliable shape error in a computer-implemented simulation of the AM process.

11. The system of claim 10, further comprising:
a three-dimensional (3D) printing device configured to receive the at least one design parameter and to produce the object to be manufactured based on the at least one design parameter based on the computer-implemented simulation.

12. The system of claim 11, further comprising:
a measuring device configured to acquire measures during manufacture and provide the measures to the optimization processor, wherein the optimization processor uses the received measure information to re-compute the at least one parameter to minimize the shape error and communicates the recomputed at least one parameter to the 3D printing device.

13. The system of claim 11, wherein the 3D printing device is configured to perform laser powder deposition (LPD).

14. The system of claim 10, wherein the information representative of an uncertainty in at least one process parameter comprises a probability distribution of a manufacturing error due to the uncertainty.

15. The system of claim 10, wherein the at least one design parameter comprises at least one of laser power in an AM device and laser motion speed in the AM device.

16. The system of claim 10, wherein the uncertainty in at least one process parameter comprises a stand-off distance determined by a distance between a laser of an AM device and the object to be manufactured.

17. The system of claim 10, wherein the optimization processor is configured to run a simulation of the AM process, using the received at least one design parameter and the uncertainty information to iteratively calculate the shape error during the simulation of the AM process.

18. The system of claim 17, wherein the optimization processor is further configured to quantify the uncertainty based on the uncertainty information during each iteration.

19. The system of claim 17, wherein the optimization processor is configured to select a number of samples from the uncertainty information for determining a shape error.

20. The system of claim 19, wherein the optimization processor is configured to perform a set of simulations, each simulation based on a different number of samples, determining an average expected error and a range of error for each simulation, and selecting a number of samples corresponding to a simulation having a lowest number of samples where the range of error is smaller than a predetermined threshold value.

* * * * *